(12) United States Patent
Yamamoto et al.

(10) Patent No.: US 7,205,709 B2
(45) Date of Patent: Apr. 17, 2007

(54) IMAGE DISPLAY MEDIUM AND IMAGE FORMATION DEVICE

(75) Inventors: Yasuo Yamamoto, Minamiashigara (JP); Hidehiko Soyama, Minamiashigara (JP); Satoshi Hiraoka, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 246 days.

(21) Appl. No.: 10/928,499

(22) Filed: Aug. 30, 2004

(65) Prior Publication Data

US 2005/0151463 A1    Jul. 14, 2005

(30) Foreign Application Priority Data

Jan. 9, 2004    (JP)    ............................. 2004-004242

(51) Int. Cl.
*H01J 1/62*    (2006.01)
*H01B 3/18*    (2006.01)

(52) U.S. Cl. .................. 313/483; 252/572; 252/73; 252/77

(58) Field of Classification Search ........ 313/495–497, 313/483; 252/572, 73, 77, 79
See application file for complete search history.

(56) References Cited

FOREIGN PATENT DOCUMENTS

JP    A 2001-312225    11/2001

*Primary Examiner*—Joseph Williams
(74) *Attorney, Agent, or Firm*—Oliff & Berridge, PLC

(57) ABSTRACT

The present invention provides an image display medium including a pair of substrates disposed so as to face each other and first and second particles contained in space between the pair of substrates, wherein the first particles can be positively or negatively charged due to external stimulus and have one color and a particle size distribution in which at least one peak is present on a coarse side of the most frequent particle diameter of the first particles, and the second particles are not charged or can be charged due to the external stimulus to have polarity opposite to that of the first particles and have another color: and an image formation device comprising the image display medium and a generator for generating an electric field between the pair of substrates in accordance with an image to be displayed.

20 Claims, 11 Drawing Sheets

—·—·— : CONVENTIONAL PARTICLE

———— : INVENTIVE PARTICLE 1

-------- : INVENTIVE PARTICLE 2

F I G. 6
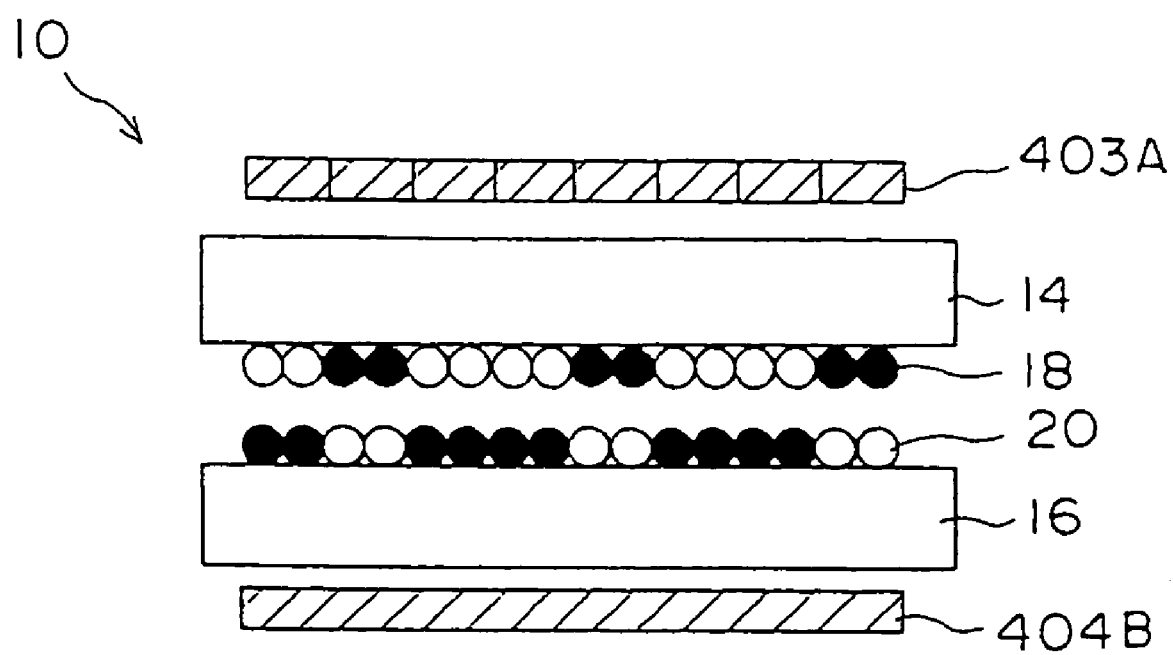

F I G. 11
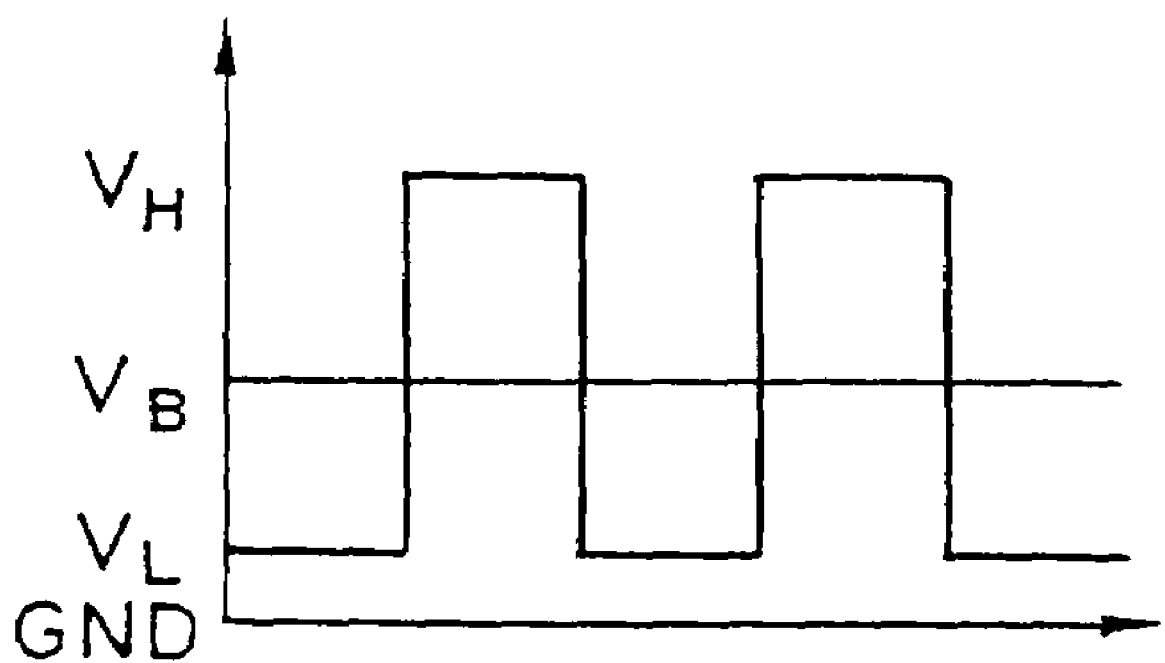

IMAGE DISPLAY MEDIUM AND IMAGE FORMATION DEVICE

CROSS-REFERENCE TO RELATED APPLICATION

This application claims priority under 35 USC 119 from Japanese Patent Application No. 2004-4242, the disclosure of which is incorporated by reference herein.

BACKGROUND OF THE INVENTION

1. Field of the Invention

The present invention relates to an image display medium that uses particles and can repeatedly display images and to an image formation device.

2. Description of the Related Art

Heretofore, display technologies such as a Twisting Ball Display (display by rotation of particles that are coated with two separate colors), electrophoresis, magnetophoresis, thermally rewritable display media, and liquid crystals having a memory property have been proposed as repeatedly rewritable display mediums. However, these image display technologies, although excellent in a memory property of images, have problems in that they are unable to display white as ordinary paper does and that contrast is low.

A display technology, in which a conductive colored toner and white particles are contained in space between opposing electrode substrates, and electric charges are injected through a charge transport layer disposed on the inside surface of the electrode of a non-display substrate to the conductive colored toner, and an electric field between the electrode substrates causes charge-injected conductive colored toner to move toward a display substrate located facing the non-display substrate, and the conductive colored toner sticks to the inside of the display substrate, and contrast between the conductive colored toner and the white particles enables display of an image, was proposed as a display technology using a toner that solves such problems as mentioned above (Japan Hardcopy '99 Papers, pp. 249–252). The display technology is excellent in that the whole image display medium is made of solid matters and that display of white and black (color) can be completely switched in principle. However, according to the technology, there are conductive colored toner particles that do not come into contact with the charge transport layer disposed on the inside surface of the electrode of the non-display substrate and conductive colored toner particles each of which exists apart from the other conductive colored toner particles. Electric charges are not injected into these lone conductive colored toner particles. Therefore, they do not move even when an electric field is applied thereto. Moreover, they are present at random between the substrates. Accordingly, density contrast lowers.

With an intention of improving such problems, an image display medium that includes a pair of substrates and plural kinds of particles that are contained in space between the pair of substrates, that can be moved between the substrates by an applied electric field and that have different colors and charging properties has been proposed (Japanese Patent Application Laid-Open (JP-A) No. 2001-312225). According to the proposal, it is described that high whiteness and density contrast can be obtained.

In the image display medium, white density, black density and density contrast are excellent at an initial stage. However, when rewriting is repeated over a long period, image density may decrease, which decrease density contrast. Moreover, uniformity of an image may decrease, which causes image irregularity. Furthermore, contamination of the transparent substrate proceeds during long-term use, which may decrease contrast, display glossiness and visibility.

After earnestly researching the aforementioned problems, the inventors of the present invention found that instability of a charge amount due to frictional charging between particles, and adhesion to the transparent display substrate of particles pulverized due to collision and grinding between particles cause these problems.

Accordingly, there is a need for an image display medium that, even after repetition of rewriting over a long period, has small image density variation and small variation in density uniformity and can display images with stable density contrast, and for an image formation device using the same.

SUMMARY OF THE INVENTION

In order to overcome these problems, the inventors of the invention carried out earnest study in the following manner.

First, when an image display medium is prepared, two kinds of particles to be contained in space between a pair of substrates, namely first particles which can be negatively or positively charged and second particles which can be charged to have polarity opposite to that of the first particles are blended in a predetermined rate in a blending vessel and agitated. It is thought that in the course of the mechanical agitation and blending, frictional charging is caused between the particles and between the particles and the inner wall of the vessel and that the respective particles are then charged. Thereafter, the blended particles are contained in space between the pair of substrates such that the ratio of the total volume of the particles to the volume of the space is a predetermined value. The particles contained in the space between the substrates are moved toward one substrate or the other substrate in accordance with an electric field by switching the polarity of a direct current voltage applied between the substrates or applying an alternating current voltage (initializing process).

Even in the process, it is thought that collision occurs between the respective particles and between the particles and a substrate surface, which means a surface of a substrate which surface faces the other substrate (Hereinafter, unless mentioned otherwise, the substrate surface means the surface of the substrate that faces the other substrate) and causes frictional electrification of the particles. At this time, the first particles and the second particles are charged so as to have different polarities, and coulombic attraction works between the first and second particles and causes the first and second particles to attract each other. However, two kinds of particles separate and each kind of the particles adheres to a predetermined substrate in accordance with the direction of an electric field applied at the end of the initializing process. Subsequently, when an electric field is applied to the particles in accordance with an image signal, the first and second particles separate, move and respectively adhere to different substrates in accordance with the electric field.

That is, it is thought that when electrostatic force that works on the respective charged particles due to an externally applied electric field is stronger than any of coulombic force between the particles, image force between the particle and the substrate surface, and force due to contact-potential difference, the two kinds of particles separate, move and respectively adhere to different substrates.

Then, the particles adhering onto the substrates are firmly fixed on the substrates by the image force occurring between the particle and the substrate surface and van der Waals attraction between the particle and the substrate.

When the charging property of each particle is high, cohesive force between the particles becomes high. Accordingly, it is difficult to separate the first and second particles. Furthermore, the particles having a higher charging property tend to firmly adhere to the substrate surface. Therefore, such particles may not move and may remain on the substrate, even when an electric field which works to move such particles toward the opposite substrate is applied. Furthermore, it is thought that, when agglomerates having a high charging property are separated, local discharge may occur and the charging property becomes unstable. Meanwhile, when the charging property of each particle is low and there is only small difference in the charging properties of the first and second particles, the respective particles are hardly separated by electrostatic force due to an external electric field and remain in a loosely coagulating state.

Accordingly, in order that the external electric field separates the particles having different polarities, it is important that the respective particles have a proper charging amount and frictional charging characteristics in which the number of charged particles having polarity opposite to that which the particles must have is small.

Next, when the polarity of an electric field is switched repeatedly in such an image display medium to move the particles, friction between the particles, and friction between the particle and the substrate surface increase the charging amount of the particles. As a result, the particles may coagulate or may so firmly adhere to a substrate surface layer that they are difficult to separate, or image unevenness may occur. The particles that cause the image unevenness have been checked, and it has been confirmed that collision between the particles breaks some of the particles and that fine particles thereby occur and that the fine particles have a wide charging amount distribution from a high charging amount to a low charging amount. It is thought from this fact that change in the charging property of the particles being small, and move and removal of the fine particles from the substrate surfaces are important to maintain the initial operation state of the particles.

One of methods for controlling the charging property of the particles is a method of externally adding fine particles of an inorganic oxide or a resin to the surface of each of the particles. However, in the method, collision or rubbing between the two kinds of particles causes the fine particles on particles to move toward the other kind of particles or to a transparent electrode substrate, which decreases the charging amounts of the two kinds of particles. The collision also changes powder fluidity, and thereby lowers display contrast.

In order to prevent the externally added fine particles from falling off such a particle surface or moving to other particles and members, it is important to maintain the charging property and fluidity of the particles.

The inventors of the invention have taken the above-explained findings into consideration, and have devised the following invention to achieve the above demand.

A first aspect of the invention provides an image display medium including a pair of substrates disposed so as to face each other and first and second particles contained in space between the pair of substrates, wherein the first particles can be positively or negatively charged due to external stimulus and have one color and a particle size distribution in which at least one peak is present on a coarse side of the most frequent particle diameter of the first particles, and the second particles are not charged or can be charged due to the external stimulus to have polarity opposite to that of the first particles and have another color.

A second aspect of the invention provides an image formation device including the image display medium and a generator for generating an electric field between the pair of substrates in accordance with an image to be displayed.

The invention can provide an image display medium that has small changes in image density and in density uniformity and can display images with stable density contrast even after repeated rewriting over a long period, and an image formation device including the same.

BRIEF DESCRIPTION OF THE DRAWINGS

Preferred embodiments of the invention will be described in detail based on the following figures, wherein:

FIG. 6 is a diagram showing a schematic cross-section of still another example of the image formation portion (image display medium 10) which schematic cross-section is obtained by cutting the image formation device 12 shown in FIG. 3 along an arbitrary plane thereof;

FIG. 11 is a diagram showing potentials of an electrostatically latent image holding member and a counter electrode.

DETAILED DESCRIPTION OF THE INVENTION

Hereinafter, the invention will be described in detail.

<Image Display Medium>

An image display medium of the invention includes a pair of substrates disposed so as to face each other and first and second particles contained in space between the pair of substrates, and the first particles can be positively or negatively charged due to external stimulus and have one color and a particle size distribution in which at least one peak is present on a coarse side of the most frequent particle diameter of the first particles, and the second particles are not charged or can be charged due to the external stimulus to have polarity opposite to that of the first particles and have another color.

First, the first and second particles that are used as display particles in the image display medium of the invention will be explained.

First and Second Particles

It is necessary that the image display medium of the invention has the first particles (hereinafter, in some cases, referred to as "particular particles") having a particle size distribution in which at least one peak is present at a coarse side of (diameter or diameters larger than) the most frequent particle diameter of the first particles. Hereinafter, in the image display medium of the invention, the first and second particles are generically called "display particles".

The particle size distribution of the particular particles can be measured with a measuring device such as Multisizer II manufactured by Beckman Coulter, Inc. Based on the particle size distribution, the most frequent particle diameter of the particular particles can be obtained. The most frequent particle diameter may be one obtained from statistics according to volume or number.

The particle size distribution of the particular particles has at least one peak at a coarse side of the most frequent particle diameter. The peak will be explained while referring FIG. 1.

Figure 1:
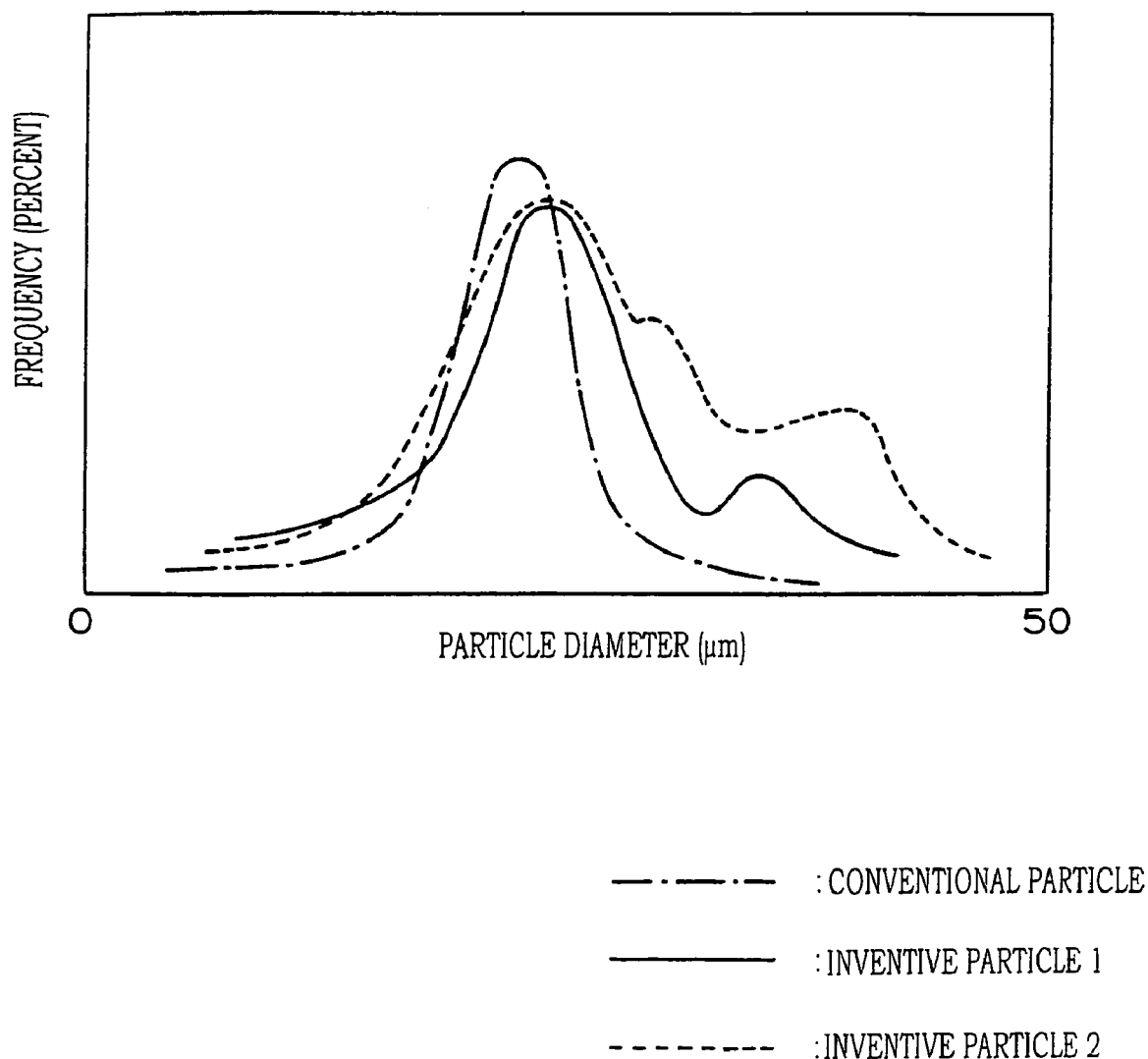
FIG. 1 is a diagram for explaining particle size distributions of conventional particles and particles (particular particles) used in the invention.

FIG. 1 is a diagram for explaining particle size distributions of conventional particles and the particular particles.

As shown in FIG. 1, the particle size distribution of the particular particles has a peak at a coarse side of the most frequent particle diameter thereof. That is, in particle size distribution curves shown by a solid line and a regularly dotted line in FIG. 1, at least one projection point (peak) is present at a coarse side of the most frequent particle diameter. The particle size distribution of particles 1 used in the invention has one projection point at a coarse side of the most frequent particle diameter thereof and the particle size distribution of particles 2 used in the invention has two projection points at diameters larger than the most frequent particle diameter thereof.

The most frequent particle diameter and the projection point(s) (peak(s)) at the coarse side of the most frequent particle diameter are obtained from statistics according to volume or number.

In the particle size distribution curves of FIG. 1, the peaks clearly appears as projection points, however it is unnecessary that a peak in the invention clearly projects. For instance, when a particle size distribution curve has a step-like shape such as a so-called shoulder at a coarse side of the most frequent particle diameter, the step-like shape can be regarded as a peak.

Unlike the particular particles, conventional particles shown in FIG. 1 have a particle size distribution curve like a normal distribution, and therefore the distribution has no projection portion other than the peak of the most frequent particle diameter or no step portion.

Hereinafter, in the invention, a preferable relationship between the height of the peak at the most frequent particle diameter and that of a peak at a coarse side of the most frequent particle diameter (projection point) will be explained.

As shown in FIG. 1, the peak height that is explained here is expressed as frequency (percent), and shows the ratio of the number of particles having a particle diameter which corresponds to the summit of the peak to the total number of measured particles. Such a peak height is expressed in terms of volume percent when the particle size distribution curve is based on statistics according to volume, or in terms of number percent when the particle size distribution curve is based on statistics according to number.

The ratio of the peak height (B) of the peak at a coarse side of the most frequent particle diameter to the peak height (A) of the most frequent particle diameter, that is, (B)/(A), preferably satisfies the following relationship: $0.01<(B)/(A)<1$. The ratio more preferably satisfies the following relationship: $0.1<(B)/(A)<0.3$.

When the ratio (B)/(A) is 0.01 or less, the number of particles having a diameter larger than the most frequent particle diameter is low, and voltage at the time of application of an electric field shifts toward a higher side, and it becomes difficult to secure a stable image maintaining property.

Meanwhile, when the ratio (B)/(A) is not less than 1, a coarse image is displayed, and inferior image quality is obtained.

In the preferable relationship, when peaks appear at diameters larger than the most frequent particle diameter, the peak height (B) means the sum of the peak heights of these peaks.

Hereinafter, in the invention, the preferable relationship between the most frequent particle diameter and a particle diameter which is larger than the most frequent particle diameter and at which a peak appears will be explained.

The ratio of the particle diameter (D) which is larger than the most frequent particle diameter and at which the peak appears to the most frequent particle diameter (C), that is, (D)/(C), preferably satisfies the following relationship: $1<(D)/(C)<3$. The ratio more preferably satisfies the following relationship: $1.2<(D)/(C)<2$.

When the (D)/(C) is 1 or less, the peak, the top of which is the most frequent particle diameter, and the peak, the top of which is the particle diameter larger than the most frequent particle diameter may overlap each other and the particle size distribution which the particular particles in the invention are required to have cannot be obtained.

Furthermore, when the ratio (D)/(C) is not less than 3, the sizes of the particles become too large, a coarse image is displayed, and inferior image quality is obtained.

In the preferable relationship, when peaks appear at diameters larger than the most frequent particle diameter, the particle diameter (D) means the largest particle diameter at which one of the peaks appears.

Examples of methods of preparing the particular particles having such a particle size distribution include a method of blending two or more kinds of particles having different particle size distributions in an appropriate blending ratio.

In the method of blending two or more kinds of particles having different particle size distributions, particles used are those which can be positively or negatively charged and which have a desired color or colors. For instance, such particles can be various kinds of particles used in conventional image display media.

A device for blending particles can be one which has a rotary blade such as a TM Mixer (manufactured by Mitsui Mining Company, Limited), a V-blender in which a container rotates (available from Irie Shokai), or any of W type blender SCM series (manufactured by Seishin Enterprise Co., Ltd.). However, the blending device is not particularly limited thereto.

The particular particles in the invention have relatively coarse particles since they have the particular particle size distribution as mentioned above.

When such particular particles are used in an image display device, particles other than coarse particles easily and smoothly move toward an electrode that is opposite to an electrode to which the coarse particles adhered (from one substrate to the other substrate) at the time of application of alternate bias voltage for image rewriting. This is because the coarse particles have a smaller ratio of surface to volume than the other particles, and therefore, when charged by external stimulus, have a smaller charge density on the particle surface thereof. The coarse particles collide with the opposite electrode and impact at this time dashes away particles present on the opposite electrode, which triggers generation of continuous cloud phenomena.

Thereby adhesion between the substrate and the particle can be reduced, and therefore images can be displayed at a low voltage. As a result, the response speed of the particles contained in space between the substrates can be increased. Furthermore, since energy of collision between the particles can be reduced, particle surfaces can be suppressed from being damaged. Moreover, even when rewriting is repeated, deterioration of density contrast over time can be suppressed. Furthermore, collision between the coarse particles and the substrate removes, from the substrate, foreign matters and fine particles adhering to the substrate, which can remarkably improve visibility when rewriting is repeated.

The second particles can also have the above-mentioned particle size distribution in which at least one peak is present at a coarse side of the most frequent particle diameter of the second particles. However, the second particles may not have such a particle size distribution. In this case, the particular particles preferably have a larger specific gravity than the second particles in order to more enhance the effect of the particular particles.

In the image display medium of the invention, since the first and second particles have different colors, density contrast can be obtained between at least one image portion of the first particles and at least one image portion of the second particles.

As mentioned above, the image display medium of the invention can have small changes in image density and in density uniformity even when rewriting is repeated over a long period. The image display medium can have stable density contrast, and can be operated at a small driving voltage.

In the above explanations, an embodiment in which only the first particles that can be positively or negatively charged and the second particles that are not charged or can be charged to have polarity opposite to that of the first particles are used has been described. However, particles similar to the first particles and/or those similar to the second particles may be further used. Even in this case, since the image display medium of the invention has the first particles, effects of the invention can be exhibited due to an operation mechanism similar to above.

Furthermore, in the display particles in the invention, it is preferable that the second particles also have the particle size distribution in which at least one peak is present at a coarse side of the most frequent particle diameter of the second particles. However, conventional known particles may be used together with the particular particles as the second particles.

In the image display medium of the invention, the first or second particles are preferably white. In other words, the first or second particles preferably contain a white colorant. When the first or second particles are white, the tinting strength of the second or first particles and density contrast can be improved. The white colorant that makes the first or second particles white is preferably titanium oxide. When titanium oxide is used as the colorant, the hiding power can be heightened and therefore density contrast can be more improved in the wavelength range of visible light. The white colorant is particularly preferably rutile type titanium oxide.

Furthermore, when the white particles are the particular particles having a wide particle size distribution as mentioned above, the substrate surface can be prevented from being buried by the particles, and hiding power is more improved, and thereby contrast can be further improved.

Components of Display Particles

The display particles (including the particular particles) used in the invention are made of colored fine particles (colorant), a charge control agent, and a resin.

Hereinafter, the respective components of the display particles in the invention will be explained.

Colorant

The colorant used as one of components of the display particles in the invention can be carbon black, titanium black, magnetic powder, other inorganic black pigment, an organic black pigment; a white pigment such as rutile type titanium oxide, anatase type titanium oxide, zinc oxide, white lead, zinc sulfide, aluminum oxide, silicon oxide or zirconium oxide; or a colorant having chromatic color such as phthalocyanine, quinacridine, azo, a condensate, an insoluble lake pigment, or an inorganic oxide dye or pigment.

More specifically, typical examples thereof include aniline blue, Chalcooil blue, chrome yellow, ultramarine blue, Dupont Oil Red, quinoline yellow, methylene blue chloride, phthalocyanine blue, Malachite green oxalate, lamp black, Rose Bengal, C.I. pigment red 48:1, C.I. pigment red 122, C.I. pigment red 57:1, C.I. pigment yellow 97, C. blue 15:1, and C.I. pigment blue 15:3.

Given that the specific gravity of the colorant is regarded as 1, the addition amount of the colorant in the particle is in the range of about 1 to about 60 weight % and preferably in the range of about 5 to about 30 weight %.

Charge Control Agent

The display particles in the invention include a charge control agent in order to control the charging property thereof.

As the charge control agent, known one used in the electrophotographic toner material can be used. Examples thereof include cetylpyridyl chloride, quaternary ammonium salts such as P-51 and P-53 (manufactured by Orient Chemical Industries, Ltd.), salicylate metal complexes, phenolic condensates, tetraphenyl compounds, calix arene compounds, metal oxide fine particles, and metal oxide fine particles whose surfaces are treated with any coupling agent. As the charge control agent, colorless one or one having low tinting strength are preferable. The addition amount thereof in the particle is preferably in the range of about 0.1 to about 10 mass % and more preferably in the range of about 0.5 to about 5 mass %.

Resistance Controll Agent

The display particle in the invention may further include a resistance control agent, if necessary.

As the resistance control agent, inorganic fine particles having a resistance value of $1 \times 10^6$ Ωcm or less can be used. Examples thereof include tin oxide, titanium oxide, zinc oxide, iron oxide, and fine particles coated with any conductive oxide (for instance, titanium oxide coated with tin oxide). The resistance control agent is preferably colorless one or one having low tinting strength. The addition amount thereof in the particle is preferably in the range that does not change or hardly change the color of the display particles colored by the colorant(s), and specifically, in the range of about 0.1 to about 10 mass %.

Resin

Examples of the resin of the display particles in the invention include polyolefin; polystyrene; polyvinyl resins such as acrylic resins, methacrylic resins, polyacrylonitrile, polyvinyl acetate, polyvinyl alcohol, polyvinyl chloride and polyvinyl butyral; copolymers such as vinyl chloride-vinyl acetate copolymers, styrene-acrylic acid copolymers, and styrene-methacrylic acid copolymers; straight silicone resins having organo-siloxane bonds and modified resins thereof; fluorinated resins such as polytetrafluoroethylene, polyvinyl fluoride and polyvinylidene fluoride; polyester; polyurethane; polycarbonate; amino resins; and epoxy resins.

The resin of the display particles in the invention can be any of binder resins which are known as one of main components of conventional electrophotographic toners.

These may be used alone or plural resins may be blended and used. Furthermore, those obtained by crosslinking these resins may be used. Among these, resins containing a crosslinking component can be preferably used.

Other Additives

Furthermore, additives other than the above components can be used in the range that does not affect hue. As one of such additives, for instance, polymer fine particles having a diameter smaller than that of the display particles to reduce the specific gravity of the display particles in the invention can be used. As the polymer of the polymer fine particles, a known one can be used. However, a polymer having a specific gravity lower than that of the colored fine particles which are used together with the polymer fine particles can be preferably used. Furthermore, when the polymer fine particles themselves have color, it is preferable to properly select the polymer fine particles in consideration of the color of the colored fine particles contained in the display particles.

Specific examples of the material of the polymer fine particles include, but are not limited to, polystyrene resins, polymethyl methacrylate resins, urea-formalin resins, styrene-acrylate resins, polyethylene resins and polyvinylidene fluoride resins. These can be used alone or in combination. These resins preferably have a crosslinked structure and preferably have a refractive index higher than that of the resin contained in the display particles.

The polymer fine particles can have any of spherical, irregular and flat shapes, however, preferably have a spherical shape.

The volume mean particle diameter of the polymer fine particles is not limited, as long as it is smaller than that of the display particles. However, the volume mean particle diameter is preferably about 10 μm or less and more preferably about 5 μm or less. Furthermore, the particle size distribution is preferably sharp and more preferably monodisperse.

Furthermore, a part or the whole of the polymer fine particles are preferably hollow from the viewpoint of preparation of the display particles having a lower specific gravity. The volume mean particle diameter of such hollow particles is not limited, as long as it is smaller than that of the display particles. However, it is preferably about 10 μm or less and more preferably about 5 μm or less. In particular, the volume average particle diameter of the hollow particles is more preferably in the range of about 0.1 to about 1 μm and particularly preferably in the range of about 0.2 to about 0.5 μm from the viewpoint of scattering of light.

The "hollow particles" mean those having a void inside. The percentage of void is preferably in the range of about 10 to about 90 percent. The "hollow particles" may be those in a hollow capsule state or those the outer walls of which are porous.

Furthermore, since in the hollow particles, scattering of light, which is caused at an interface by the difference between the refractive index of a resin layer serving as an external shell portion and that of an air layer inside of the particles in the case of those having a hollow capsule form, or by the difference between the refractive index of an outer wall and that of a void in the case of those the outer wall of which is porous, is useful in improving whiteness and hiding power, it is particularly preferable for the white display particles to include a void inside.

In the display particles in the invention, the addition amount of the polymer fine particles (hollow particles) is preferably in the range of about 1 to about 40 mass % and more preferably in the range of about 1 to about 20 mass % with respect to the total of the display particles.

Method of Manufacturing Display Particle

The display particles in the invention may be manufactured by either a wet method such as suspension polymerization, emulsion polymerization or dispersion polymerization or a conventional pulverization and classification method. Particles obtained by the wet manufacturing method have a spherical shape and particles obtained by the pulverization and classification method have an irregular shape.

In order to arrange the shape of the spherical particles or the irregular particles obtained according to these methods, heat treatment of these particles may be conducted.

As a method of arranging a particle size distribution, a method of regulating granulating conditions in the wet manufacturing method or a method in which obtained particles are classified can be used.

When the granulating conditions in the wet manufacturing method are regulated, an agitation speed may be regulated at the time that an oil phase in which materials of the display particles are dispersed is dispersed in an aqueous phase. Moreover, when a surfactant is used, the concentration thereof is regulated, and thereby the particle size distribution of the particles can be regulated.

Examples of methods of classifying the particles include, but are not limited to, methods that make use of, for instance, various kinds of vibration sieves, ultrasonic sieves, air sieves and wet sieves, and rotor type classifiers that make use of the principle of centrifugal force and wind classifiers. These can be used alone or in combination to desirably regulate the particle size distribution. In particular, when precise regulation is carried out, the wet sieve can be preferably used. When a classifier, for instance, the rotor type classifier, is used, ultrafine particles and/or coarse particles can be selectively removed from the particles to be classified by regulating the number of revolution. A nylon sieve can be preferably used, since it has pores having a narrow size distribution and can provide high yield.

The volume mean diameter of the display particles is not generally defined. However, in order to obtain a good image, it is preferably in the range of about 0.1 to about 30 μm, more preferably in the range of about 2 to about 20 μm and still more preferably in the range of about 2 to about 15 μm.

The display particles preferably have a shape close to sphere. When the display particles are nearly spherical, particles substantially come into contact with each other through point contact, and furthermore the particle and the substrate also substantially come into contact with each other through point contact. Therefore, adhesion between the particles and between the particle and the substrate which adhesion is based on van der Waals force diminishes. Accordingly, it is thought that even when the surface of the substrate is made of a dielectric, charged particles can smoothly move between the substrates due to an electric field.

Substrate

Hereinafter, the substrate of the image display medium of the invention will be explained.

In the image display medium of the invention, a pair of substrates which are disposed so as to face eath other are used and the display particles are contained in space between the pair of substrates.

When the charged state of particles which can be positively or negatively charged is regulated by using an electric field as external stimulus, a conductive plate-like body (conductive substrate) is used as the substrate. In this case, in order to enable the resultant medium to serve as an image display medium, at least one of the substrates is necessarily a transparent conductive substrate. In such a case, a side of the image display medium at which side the transparent conductive substrate is disposed becomes an image display surface.

The conductive substrate may be one in which the substrate is conductive itself or one in which the surface of an insulating support is made conductive. Furthermore, the conductive substrate may be crystalline or amorphous. As the material of the conductive substrate which itself is conductive, metals such as aluminum, stainless steel, nickel, and chromium and alloys thereof, and semiconductors such as Si, GaAs, GaP, GaN, SiC and ZnO can be used.

As the material of the insulating substrate, a polymer film, glass, quartz and ceramics can be used. Treatment for imparting conductivity to the insulating support can be carried out by depositing, on the support, a film made of any of metals exemplified as the specific examples of the conductive substrate which is conductive itself, gold, silver and copper by means of vapor deposition, sputtering, or ion plating.

As the conductive transparent substrate, a conductive substrate in which transparent electrodes are formed on one surface of an insulating transparent support, or a transparent support that is conductive itself is used. As the material of the transparent support that is conductive itself, transparent conductive materials such as ITO (Indium-Tin Oxide), zinc oxide, tin oxide, lead oxide, indium oxide or copper iodide can be used.

As the material of the insulating transparent support, a transparent inorganic material such as glass, quartz, sapphire, MgO, LiF, or $CaF_2$, or a film or plate of a transparent organic resin such as a fluorinated resin, polyester, polycarbonate, polyethylene, polyethylene terephthalate or an epoxy resin, an optical fiber or a SELFOC optical plate can be used.

As of the transparent electrodes disposed on one surface of the transparent support, those which are made of transparent conductive materials such as ITO, zinc oxide, tin oxide, lead oxide, indium oxide or copper iodide according to a method such as vapor deposition, ion plating and sputtering, or those in which a metal such as Al, Ni or Au is thinly deposited by means of vapor deposition and sputtering such that the resultant film becomes transparent can be used.

Surfaces of substrates which faces the opposite substrate (hereinafter, in some cases, referred to as "opposing surfaces") may affect the charging polarities of the display particles. Accordingly, a protective layer having a proper surface state can be preferably disposed on the opposing surfaces.

The protective layer can be selected mainly from the viewpoints of adhesiveness of the display particles to the opposing surfaces of the substrates, and triboelectric series, transparency of the substrates, and inhibition of contamination of the opposing surfaces. As specific material of the protective layer, for instance, a polycarbonate resin, a vinyl silicone resin or a fluorine-containing resin can be used. In selection of the resin, a resin which has small difference between frictional electrification of the resin and that of the material of the surfaces of the display particles or that of the display particles is selected.

<Image Formation Device>

An image formation device of the invention forms an image on the image display medium of the invention and includes, between the pair of substrates of the image display medium of the invention, a generator that generates an electric field in accordance with image information.

Hereinafter, embodiments of the image formation device of the invention that uses the image display medium of the invention will be described while referring drawings. Hereinafter, elements having similar functions are given the same reference numerals through all the drawings and explanations thereof may be omitted.

First Embodiment

Figure 2:
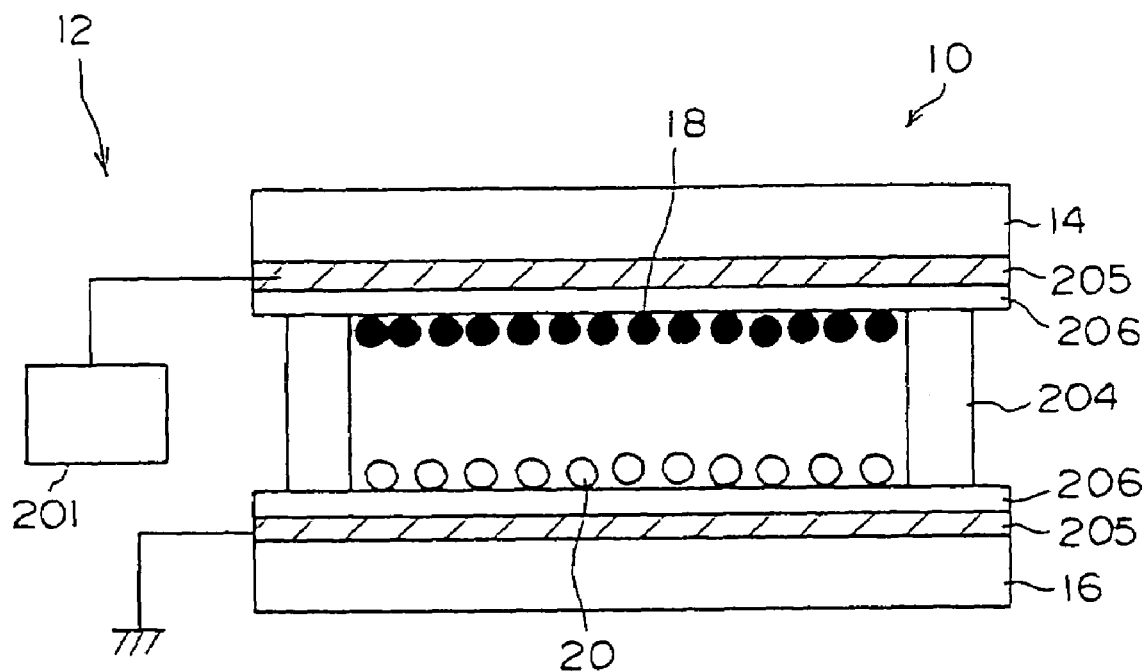
FIG. 2 is a diagram showing the schematic configuration of one example (a first embodiment) of an image formation device according to the invention.

FIG. 2 is a diagram showing the schematic configuration of one example (the first embodiment) of the image formation device of the invention.

As shown in FIG. 2, an image formation device 12 according to the first embodiment has a voltage applying unit 201 as the generator. An image display medium 10 has a display substrate 14 on which an image is displayed, a non-display substrate 16 which faces the display substrate 14, a spacer 204 which is disposed between the display substrate 14 and the non-display substrate 16 and which seals the outer circumference between the two substrates, and black particles 18 and white particles 20 which are display particles and which are contained in space defined by the display substrate 14, the non-display substrate 16 and the spacer 204. Transparent electrodes 205 are disposed on each of opposing surfaces of the display substrate 14 and the non-display substrate 16, as described later. The transparent electrodes 205 disposed on the opposing surface of the non-display substrate 16 are grounded, and the transparent electrodes 205 disposed on the opposing surface of the display substrate 14 are electrically connected to the voltage applying unit 201.

In the next place, details of the image display medium 10, that is specific examples of the respective elements, will be explained.

As the display substrate 14 and the non-display substrate 16 of the image display medium 10, for instance, a 7059 glass substrate that has a dimension of 50 mm×50 mm×1.1 mm and that has ITO transparent electrodes as the transparent electrodes 205 on the opposing surface can be used. A layer made of a polycarbonate resin 206 (a layer made of a polycarbonate resin (PC-Z) and having a thickness of 5 µm) is disposed on each of the surfaces of the transparent electrodes 205 which are disposed on the opposing surfaces of the display substrate 14 and the non-display substrate 16.

As the spacer 204, a 40 mm×40 mm×0.3 mm silicone rubber plate having, at the center portion thereof, a cutout portion (opening) which has a square shape of 15 mm×15 mm can be used.

When the image display medium 10 is prepared, the silicone rubber plate is disposed on the opposing surface of the non-display substrate 16. Subsequently, the display particles, for instance, spherical white particles 20 having a volume mean particle diameter of 20 μm and made of titanium oxide and black particles 18 having a volume mean particle diameter of 20 μm and containing carbon are blended at a mass ratio of 3:2. About 15 mg of the mixed particles are sieved through a screen into the square cutout portion of the silicone rubber plate disposed on the opposing surface of the non-display substrate 16. Thereafter, the opposing surface of the display substrate 14 is brought into close contact with the silicone rubber plate. Both the substrates are held by a double clip in this state while the double clip presses against the substrates. Thereby, the silicone rubber plate and the both substrates are brought into close contact with each other, and then the image display medium 10 is prepared.

In the explanations of FIG. 2 and drawings shown below, as mentioned above, either or both of the display particles 18 and 20 are the particular particles.

Second Embodiment

Hereinafter, a second embodiment according to the invention will be explained in detail while referring drawings.

Figure 3:
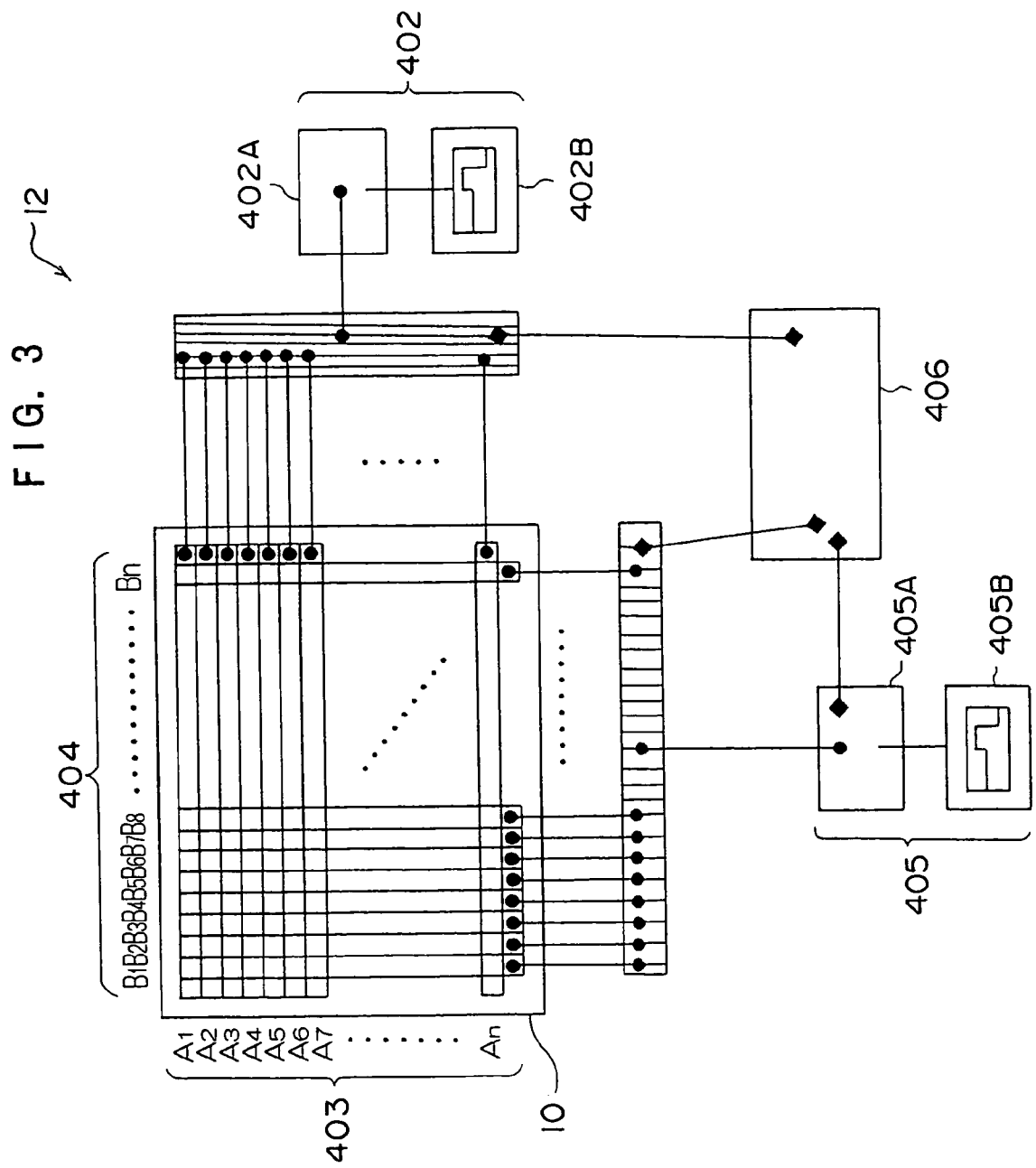
FIG. 3 is a diagram showing the schematic configuration of another example (a second embodiment) of the image formation device according to the invention.

FIG. 3 is a diagram showing the schematic configuration of another example (the second embodiment) of the image formation device of the invention, and an image formation device which forms an image in an image display medium 10 by using a simple matrix driving method is shown.

Electrodes 403An and 404Bn (n is an integer) that control voltages in vertical and horizontal directions are arranged in the planar direction of the image display medium 10 including plural kinds of display particles (not shown) having different charging properties, so as to form a simple matrix structure. An electric field generator 405 has a waveform generator 405B and a power supply 405A, and the electrodes 403An are electrically connected to the power supply 405A. Another electric field generator 402 has a waveform generator 402B and a power supply 402A, and the electrodes 404Bn are electrically connected to the power supply 402A. Furthermore, the electrodes 404Bn, the power supply 405A and the electrodes 403An are electrically connected to a sequencer 406.

When an image is displayed, the electric field generator 402 or the electric field generator 405 generates potential at the corresponding electrodes 403An or 404Bn, and the sequencer 406 controls potential driving timing of each electrode to control voltage driving at each electrode, and thereby an electric field which can make the display particles to move is sequentially applied to the desired one of the electrodes 403A1 to 403An on one of the display substrate 14 and the non-display substrate 16, and an electric field is applied to or electric fields are simultaneously applied to at least one of the electrodes 404B1 to 404Bn on the other of the two substrates in accordance with image information.

Figure 4:
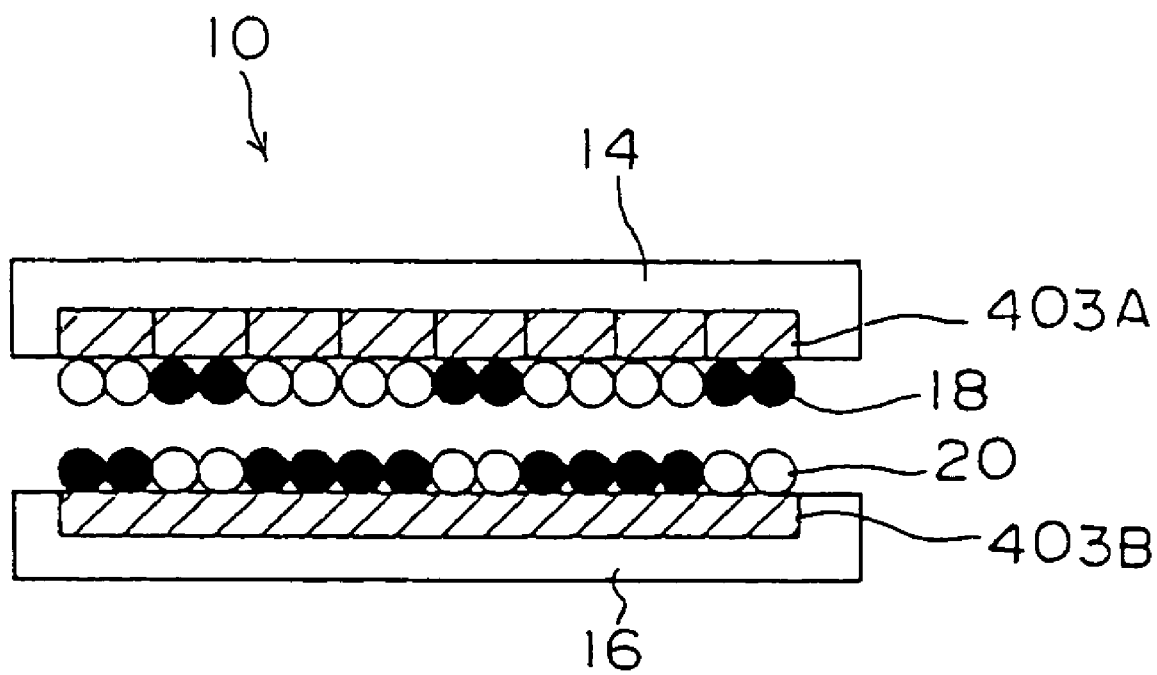
FIG. 4 is a diagram showing a schematic cross-section of one example of an image formation portion (image display medium 10) which schematic cross-section is obtained by cutting the image formation device 12 shown in FIG. 3 along an arbitrary plane thereof.
Figure 5:
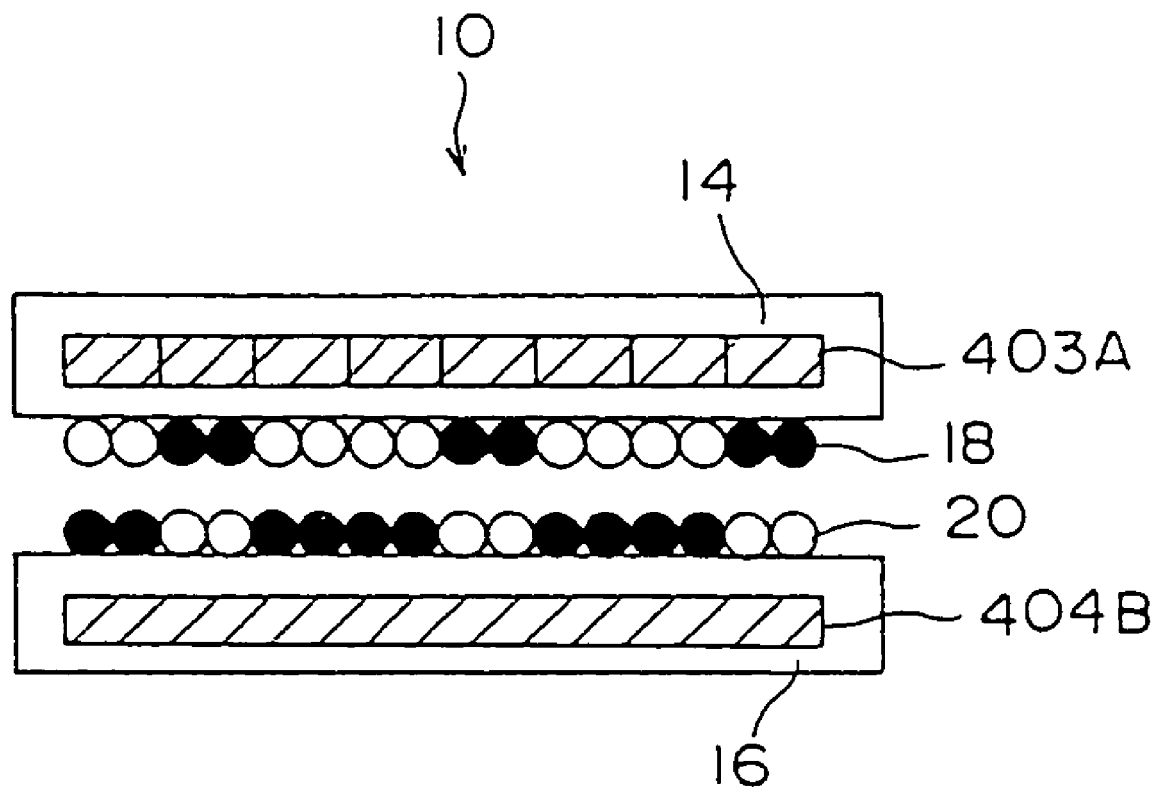
FIG. 5 is a diagram showing a schematic cross-section of another example of the image formation portion (image display medium 10) which schematic cross-section is obtained by cutting the image formation device 12 shown in FIG. 3 along an arbitrary plane thereof.

Each of FIGS. 4 to 6 is a diagram showing an example of a schematic sectional view of an image formation portion (the image display medium 10) obtained by vertically cutting, along an arbitrary line, the image display medium 10 of the image formation device 12 shown in FIG. 3.

The display particles 18 and 20 are in contact with the surfaces of electrodes or the surface of a substrate. The display substrate 14 is transparent, and the colors of the display particles 18 and 20 can show through the display substrate 14. As shown in FIG. 4, the electrodes 403A and 404B may be respectively embedded in and integrated with the substrates 14 and 16 such that the electrodes 403A and 404B be exposed to an internal air. Alternatively, as shown in FIG. 5, the electrodes 403A and 404B may be respectively buried inside the substrates 14 and 16 and thereby integrated with the substrates 14 and 16. Alternatively, as shown in FIG. 6, the electrodes 403A and 403B may be respectively spaced apart from the display substrate 14 and the non-display substrate 16 such that the electrodes 403A and 403B respectively face the outer surfaces of the display substrate 14 and the non-display substrate 16.

When an electric field is adequately set with respect to the image formation device 12, display according to simple matrix driving can be realized. The display particles 18 and 20 can be moved, as long as they have a threshold value and, when an electric field which exceeds the threshold value is applied thereto, move. As long as the above requirement is met, there is no limitation on the colors, the charging polarities, and the charging amounts of the display particles 18 and 20.

Third Embodiment

Figure 7:
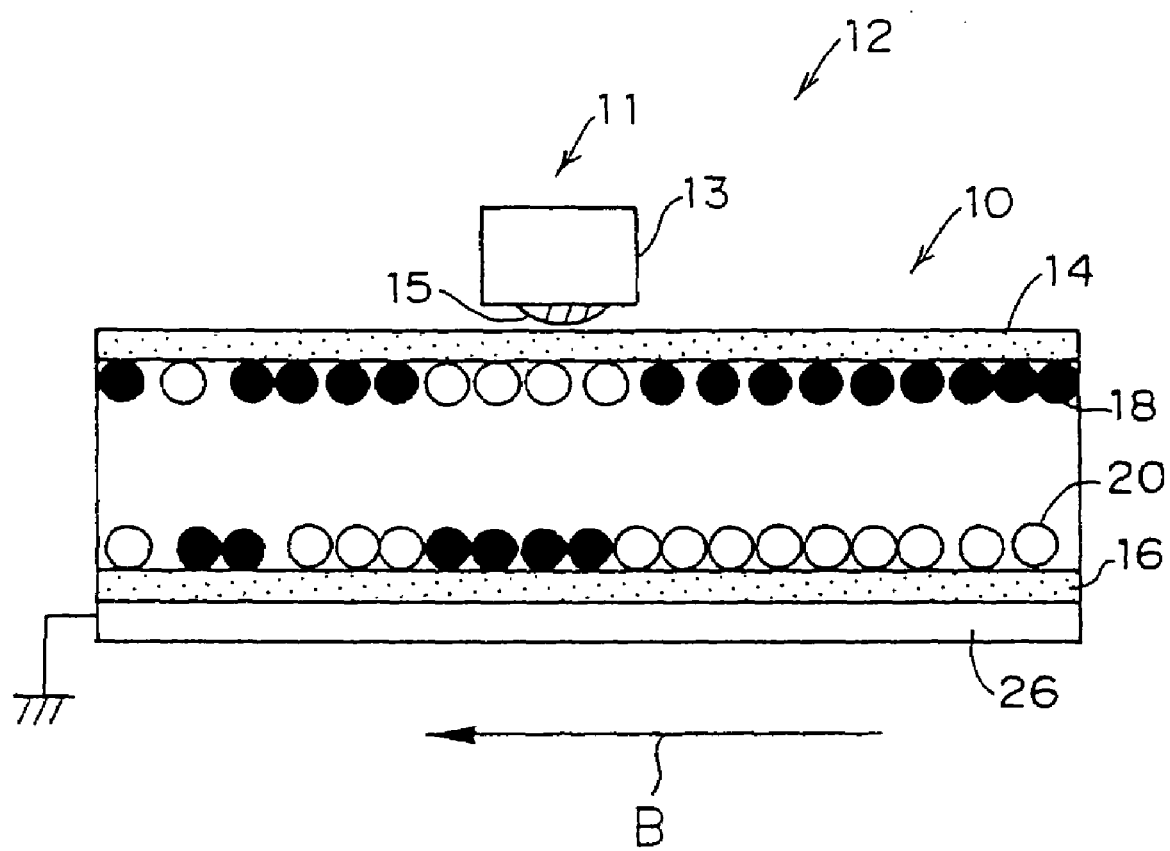
FIG. 7 is a diagram showing the schematic configuration of another example (a third embodiment) of the image formation device according to the invention.

Hereinafter, a third embodiment of the invention will be described while referring drawings. FIG. 7 is a diagram showing the schematic configuration of another example (the third embodiment) of the image formation device of the invention, and specifically showing an image formation device with a printing electrode.

The image formation device 12 shown in FIG. 7 includes a printing electrode 11 and a counter electrode 26 which is opposite the printing electrode 11 and grounded.

The image display medium 10 can move in the direction of an arrow B between the printing electrode 11 and the counter electrode 26. The image display medium 10 includes a pair of substrates (the display substrate 14 and the non-display substrate 16) and the display particles 18 and 20 contained in space between the substrates. The image display medium moves in the direction of the arrow B such that the non-display substrate 16 be disposed in the vicinity of or brought into contact with the counter electrode 26 and that a part of the display substrate 14 be disposed in the vicinity of the printing electrode 11.

The printing electrode 11 includes a substrate 13 and electrodes 15 disposed on the surface of the substrate 13 which surface faces the display substrate 14, and is electrically connected to a power supply (not shown).

Figure 8C:
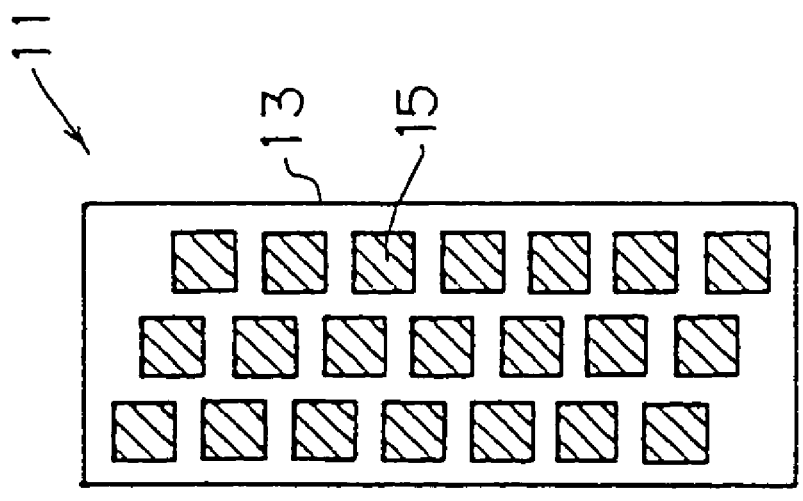
FIGS. 8A through 8C are schematic diagrams showing electrode patterns of a printing electrode.
Figure 8B:
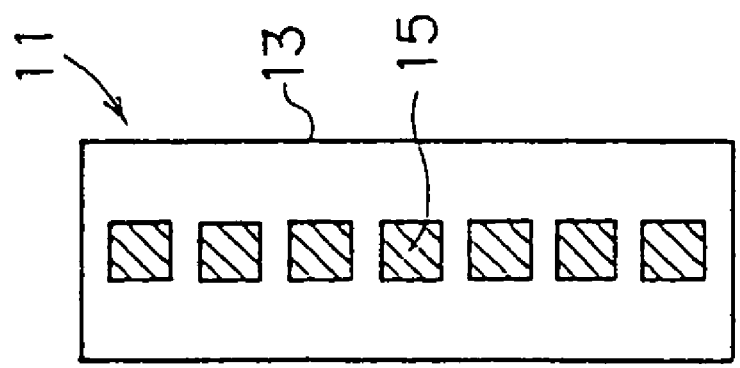
Figure 8A:
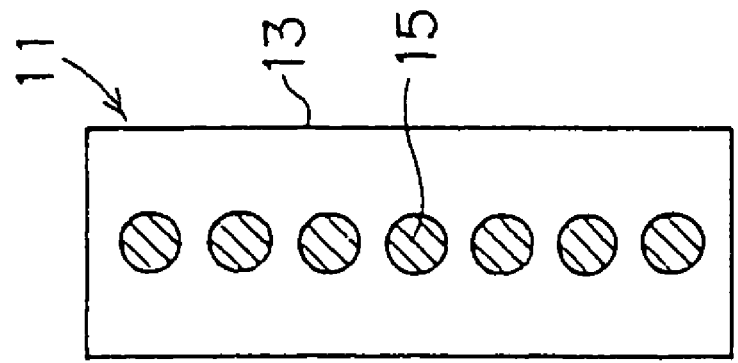

In the next place, arrangement and the shape of the electrodes 15 disposed on the surface of the printing electrode 11 which surface faces the display substrate 14 will be explained. FIGS. 8A to 8C are diagrams schematically showing examples of arrangement of the electrodes 15 disposed on the printing electrode 11 and which examples are viewed from the display substrate side of the printing electrode 11, shown in FIG. 7, on which the electrodes 15 are disposed.

As shown in FIG. 8A, the electrodes 15 are circular and disposed along one direction, which is substantially orthogonal to the moving direction (the direction of the arrow B shown in FIG. 7) of the image display medium 10 and which is a main scanning direction, at a predetermined interval, which depends on a desired image resolution, on the surface of the printing electrode 11. The electrodes 15 may be square as shown in FIG. 8B, or may be disposed in a matrix state as shown in FIG. 8C.

Figure 9:
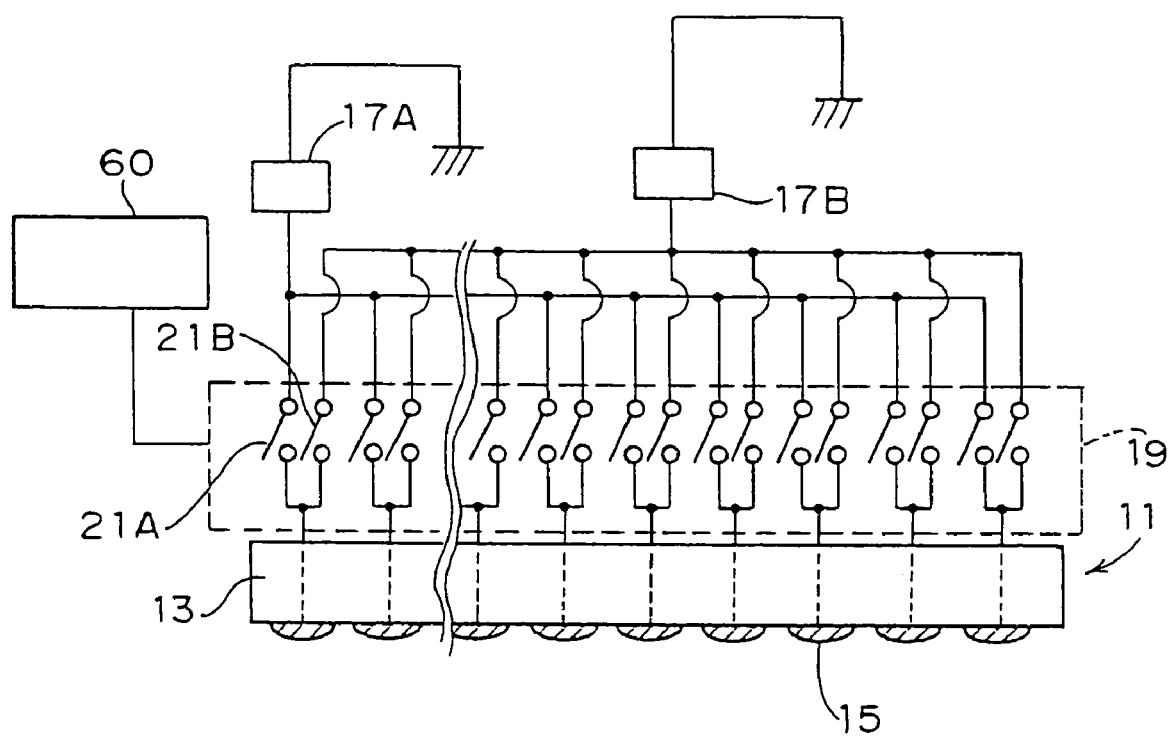
FIG. 9 is a diagram showing the schematic configuration of the printing electrode.

Next, details of the printing electrode will be explained. FIG. 9 is a diagram showing the schematic configuration of the printing electrode.

As shown in FIG. 9, an AC power supply 17A and a DC power supply 17B are electrically connected to the electrodes 15 via a connection controller 19. The connection controller 19 includes pairs of switches. Each pair of switches has a switch 21A, which has one end electrically connected to the corresponding electrode 15 and the other end electrically connected the AC power supply 17A, and a switch 21B, which has one end electrically connected to that electrode 15 and the other end electrically connected to the DC power supply 17B.

A controller 60 is electrically connected to the switches 21A and 21B and turns on or off them so as to open or close electric circuits formed between the AC power supply 17A, the DC power supply 17B and the electrodes 15. Thereby, an AC voltage, a DC voltage or a voltage in which an AC voltage and a DC voltage are added to each other can be applied to the electrode 15.

Subsequently, operation in the third embodiment will be explained.

Firstly, when the image display medium 10 is moved in the direction of the arrow B shown in FIG. 7 by a moving unit (not shown). When the image display medium arrives at space between the printing electrode 11 and the counter electrode 26, the controller 60 instructs the connection controller 19 to turn on all the switches 21A. Thereby, the AC power supply 17A applies an AC voltage to each of the electrodes 15.

Here, the image display medium 10 has two or more kinds of display particles contained in space between a pair of substrates having no electrode.

When an AC voltage is applied to the electrode 15, black particles 18 and white particles 20 in the image display medium 10 are reciprocated between the display substrate 14 and the non-display substrate 16. Thereby, the display particles are rubbed with each other and with the substrates, and at least one of the black particles 18 and the white particles 20 is frictionally charged. For instance, the black particles 18 are positively charged, whereas the white particles 20 are not charged or are negatively charged. Hereinafter, an embodiment in which the white particles 20 are negatively charged will be explained.

The controller 60 instructs the connection controller 19 to turn on only at least one switch 17B electrically connected to one of the electrodes 15 to which one a voltage should be applied in accordance with image information. Thereby, a DC voltage is applied to that electrode 15. For instance, a DC voltage is applied to a non-image portion but a DC voltage is not applied to an image portion.

Hereinafter, an embodiment in which a DC voltage is applied to a non-image portion but a DC voltage is not applied to an image portion and white particles are used to represent non-image portions will be described. When a DC voltage is applied to the electrode 15, an electric field works between a portion of the display substrate 14 which portion faces the electrode 15 and a portion of the non-display substrate 16 which portion faces the portion of the display substrate 14 and thereby the positively charged black particles move toward the non-display substrate 16 and the negatively charged white particles 20 move toward the display substrate 14, as shown in FIG. 7. Accordingly, only the white particles 20 are disposed on the portion of the display substrate 14 which portion faces the electrode 15 and the portion becomes a non-image portion.

Meanwhile, when a DC voltage is not applied to the electrode 15 and only an AC voltage is applied to the electrode 15, the positively charged black particles 18 that exists on the portion of the display substrate 14 which portion faces the electrode 15 remain there due to the influence of an electric field. Furthermore, the positively charged black particles 18 that existed on or in the vicinity of the non-display substrate 16 move toward the display substrate 14 due to the influence of the electric field. Accordingly, only the black particles 18 are disposed on the portion of the display substrate 14 which portion faces the electrode 15 and the portion becomes an image portion.

Thus, the black particles 18 and the white particles 20 move in accordance with image information to display an image on the display substrate 14. When the white particles 20 are not charged, an electric field causes only the black particles 18 to move. The black particles 18 on a portion of the display substrate 14 which portion should become a non-image portion move toward the non-display substrate 16 and are hidden by the white particles 20. Therefore, in the non-image portion, black color cannot be seen from the display substrate 14 side. Accordingly, an image can be displayed. Furthermore, even after an electric field that worked between the substrates of the image display medium 10 has disappeared, a displayed image can be maintained due to adhesion which the display particles intrinsically have. When an electric field works again between the substrates, these display particles can move again. Accordingly, images can be repeatedly displayed on the image formation device 12.

Thus, an electric field causes the charged display particles to move and air is contained together with the display particles in the image display medium 10 as an internal medium. Accordingly, the image display medium 10 and the image formation device 12 are highly safe. Furthermore, since air has a low viscosity resistance, the image display medium 10 and the image formation device 12 can respond at a high speed.

Fourth Embodiment

Figure 10:
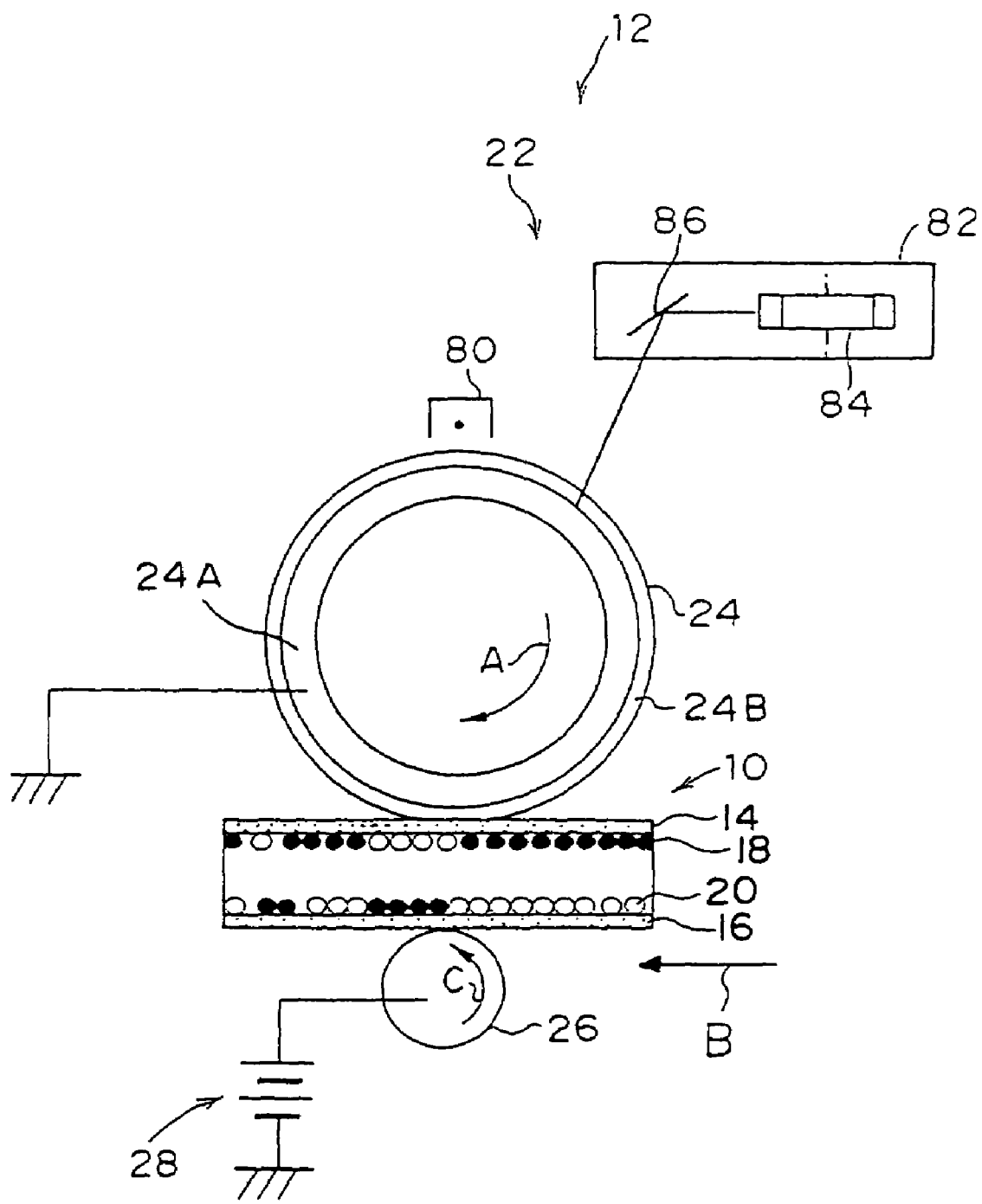
FIG. 10 is a diagram showing the schematic configuration of another example (a fourth embodiment) of the image formation device according to the invention.

Hereinafter, details of the fourth embodiment of the invention will be explained while referring drawings. FIG. 10 is a diagram showing the schematic configuration of another example (the fourth embodiment) of the image formation device according to the invention, and an image formation device which has an electrostatically latent image holding member as the generator is shown.

The image formation device 12 shown in FIG. 12 includes, as main components thereof, an electrostatically latent image holding member 24 which is a drum and which can rotate in the direction of an arrow A, an counter electrode 26 which is a drum and which is opposite the electrostatically latent image holding member 24 and which can rotate in the direction of an arrow C, the image display medium 10 having a pair of substrates and the display particles contained in space between the pair of the substrates, a charging unit 80, and a light beam scanner 82. The image display medium 10 can move in the direction of an arrow B between the electrostatically latent image holding member 24 and the counter electrode 26.

The charging unit 80 is disposed in the vicinity of the electrostatically latent image holding member such that the electrostatically latent image holding member 24 is disposed between the charging unit 80 and the counter electrode 26. The light beam scanner 82 is disposed downstream from the charging unit 80 in the direction of the arrow A so as to form an electrostatically latent image on the surface of the electrostatically latent image holding member 24. An electrostatically latent image formation portion 22 is composed of these three members.

As the electrostatically latent image holding member 24, a photoreceptor drum 24 can be used. The photoreceptor drum 24 has a conductive substrate 24A which is a drum and which is made of aluminum or SUS, and a photoconductive layer 24B disposed on the outer surface of the conductive substrate 24A. The photoconductive layer 24B can be made of any known material. For instance, inorganic photoconductive materials such as α-Si, α-Se and $As_2Se_3$, and organic photoconductive materials such as PVK/TNF can be used as such. The photoconductive layer 24B can be prepared by using a plasma CVD method, a vapor deposition method or a dipping method. The photoreceptor drum 24 may further have a charge transport layer, and/or an overcoat layer, if necessary. The conductive substrate 24A is grounded.

The charging unit 80 uniformly charges the surface of the electrostatically latent image holding member 24 in order that the surface has a desired potential. The charging device 80 can be any one, as long as it can charge the surface of the photoreceptor drum 24 in order that the surface has an arbitrary potential. In this embodiment, a corotron which generates corona discharge between an electrode wire and the electrostatically latent image holding member 24 by applying a high potential to the electrode wire, and which uniformly charges the surface of the photoreceptor drum 24 is used as the charging unit 80. However, various kinds of known charging devices such as ones including a conductive roll member, a brush or a film member which is brought into contact with the photoreceptor drum 24, and to which a voltage is applied so as to charge the surface of the photoreceptor drum 24 can be used.

The light beam scanner 82 irradiates thin light on the surface of the charged electrostatically latent image holding member 24 in accordance with image information such that the light forms an extremely small spot on the electrostatically latent image holding member 24. Thereby, an electrostatically latent image is formed on the electrostatically latent image holding member 24. The light beam scanner 82 can be any one, as long as it can irradiate light beams on the surface of the photoreceptor drum 24 in accordance with image information so as to form an electrostatically latent image on the uniformly charged photoreceptor drum 24. In this embodiment, a Raster Output Scanner (ROS) unit is used as the light beam scanner 82. The ROS unit includes therein an image formation optical system having a polygon mirror 84, a return mirror 86, a light source and a lens (these are not shown in the figure), and scans light beams on the surface of the photoreceptor drum 24 by intermittently irradiating laser beams, whose diameter is regulated to a predetermined spot diameter, in accordance with image information. However, an LED head in which LEDs are arranged in accordance with a desired resolution may be used as the light beam scanner 82.

The counter electrode 26 is, for instance, an electrically conductive elastic roll member. Thereby, it can be brought into close contact with the image display medium 10. Furthermore, the counter electrode 26 is disposed such that the image display medium 10, which is moved by a moving unit (not shown) in the direction of the arrow B shown in FIG. 10, is disposed between the counter electrode 26 and the electrostatically latent image holding member 24. A DC voltage power supply 28 is electrically connected to the counter electrode 26. The DC voltage power supply 28 applies a bias voltage $V_B$ to the counter electrode 26. For instance, as shown in FIG. 11, given that the potential of a positively charged portion of the electrostatically latent image holding member 24 is $V_H$ and the potential of a non-charged portion thereof is $V_L$, the bias voltage $V_B$ applied is set at an intermediate potential between the two potentials $V_H$ and $V_L$.

In the next place, operation in the fourth embodiment will be explained.

When the electrostatically latent image holding member 24 begins to rotate in the direction of the arrow A in FIG. 10, the electrostatically latent image formation portion 22 forms an electrostatically latent image on the electrostatically latent image holding member 24. Meanwhile, the image display medium 10 is moved in the direction of the arrow B shown in FIG. 10 by the moving unit (not shown) and is disposed between the electrostatically latent image holding member 24 and the counter electrode 26.

Here, a bias voltage $V_B$ as shown in FIG. 11 is applied to the counter electrode 26, and the potential of a portion of the electrostatically latent image holding member 24 which portion faces the counter electrode 26 is $V_H$. When the black particles 18 have adhered to a portion of the display substrate 14 which portion faces the electrostatically latent image holding member 24 and thereafter a portion of the electrostatically latent image holding member 24 which portion faces the display substrate 14 is positively charged, the positively charged black particles 18 move from the display substrate 14 toward the non-display substrate 16 and adheres to the non-display substrate 16. Thereby, only the white particles 20 show through the portion of the display substrate 14 which portion faces the electrostatically latent image holding member, and the portion serves as a non-image portion.

Meanwhile, when the black particles 18 have adhered to the portion of the non-display substrate 16 which portion faces the counter electrode 26 and thereafter the portion of the electrostatically latent image holding member 24 which portion faces the display substrate 14 is not positively charged, the potential of the portion of the electrostatically latent image holding member 24 which portion faces the counter electrode 26 is $V_L$, and therefore the charged black particles 18 move from the non-display substrate 16 toward the display substrate 14 and adheres to the display substrate 14. Thereby, only the black particles 20 show through the portion of the display substrate 14 which portion faces the electrostatically latent image holding member, and the portion serves as an image portion.

Thus, the black particles 18 move in accordance with an image to be formed, and thereby the image is displayed on the display substrate 14. Even after an electric field that worked between the substrates of the image display medium 10 has disappeared, the displayed image can be maintained due to adhesion which the display particles intrinsically have and image force between the particles and the substrates. When an electric field works again between the substrates, the black display particles 18 and the white display particles 20 can move again. Accordingly, images can be repeatedly displayed on the image formation device 12.

As described above, since a bias voltage is applied to the counter electrode 26. Therefore, the black particles 18 can be moved in both of a case where the black particles 18 have adhered to the display substrate 14 and a case where the black particles 18 have adhered to the non-display substrate 16. Accordingly, it is unnecessary to adhere the black particles 18 to one substrate in advance. Furthermore, an image having high contrast and sharpness can be formed. In addition, an electric field causes the charged particles to move and air is contained together with the display particles in the image display medium 10 as an internal medium. Accordingly, the image display medium 10 and the image formation device 12 are highly safe. Furthermore, since air has a low viscosity resistance, the image display medium 10 and the image formation device 12 can respond at a high speed.

As described above, the embodiments of the image formation device of the invention having the image display medium of the invention have been explained while referring the drawings. However, the image formation device of the invention is not limited to these embodiments and can have any other structure according to needs. Furthermore, the embodiment in which colors of the display particle are black and white has been explained, however, the display particles having desired colors can be appropriately selected.

EXAMPLES

Hereinafter, the invention will be explained with reference to examples. However, the invention is not limited to the examples. In the following examples and comparative examples, the image display medium and the image formation device of the first embodiment (the image display medium and the image formation device shown in FIG. 2) are used. The dimensions and the materials of the respective members are the same as those mentioned above.

Manufacture of White Particle 1

Preparation of Dispersion Liquid A1

The following components are blended and pulverized by a ball mill which includes zirconia beads having a diameter of 10 mm for 20 hours, and thereby a dispersion liquid A1 is prepared.

<Composition>
Cyclohexyl methacrylate: 61 parts by mass
Titanium oxide (white pigment): 35 parts by mass
    (Tipaque CR63 manufactured by Ishihara Sangyo Co., Ltd., and having a primary particle diameter of 0.3 μm)
Hollow particle: 3 parts by mass
    (SX866 (A) manufactured by JSR Corporation, and having a primary particle diameter of 0.3 μm)
Charge control agent: 1 parts by mass
    (SBT-5-0016 manufactured by Orient Chemical Industries, Ltd.)

Preparation of Calcium Carbonate Dispersion Liquid B

The following components are blended and finely pulverizing by a ball mill in the same manner as above, and thereby a calcium carbonate dispersion liquid B is prepared.

<Composition>
Calcium carbonate: 40 parts by mass
Water: 60 parts by mass

Preparation of Mixture Liquid C

The following components are blended, deaerated by means of a ultrasonic machine for 10 minutes and agitated with an emulsifier, and thereby a mixture liquid C is prepared.

<Composition>
Calcium carbonate dispersion liquid B: 8.5 g
20% saline: 50 g

Subsequently, 35 g of the dispersion liquid A1, 1 g of ethylene glycol dimethacrylate, and 0.35 g of polymerization initiator AIBN are weighed, thoroughly blended, and deaerated for two minutes by using a ultrasonic machine. The resultant is added to the mixture liquid C, and the obtained is then emulsified with an emulsifier. In the next place, the resultant emulsion is put into a bottle, and the bottle is sealed with a silicone stopper, and deaerated under a reduced pressure by using an injection needle, and a nitrogen gas is introduced in the bottle. In this state, the components of the bottle are reacted at 65° C. for 15 hours, and thereby particles are prepared. The resultant fine particle powder is dispersed in deionized water to prepare a dispersion liquid, and calcium carbonate therein is decomposed with hydrochloric acid water, and the resultant dispersion liquid is filtered. Thereafter, the resultant particles are washed with a sufficient amount of distilled water, and then unclassified white particles are obtained. In the next place, some of the particles are sifted with a nylon sieve having a pore size of 10 μm and the other are sifted with a nylon sieve having a pore size of 15 μm to obtain particles having a desired particle diameter range. The sifted portions are combined, and the resultant particles are dried, and white particles 1 having a volume mean diameter of 13 μm is thus obtained.

Preparation of White Particle 2

The unclassified white particles are prepared in the same manner as in the preparation of white particles 1. Then, some of the particles are sifted with a nylon sieve having a pore size of 15 μm and the other are sifted with a nylon sieve having a pore size of 20 μm to obtain particles having a desired particle diameter range. The sifted portions are combined, and the resultant particles are dried, and white particles 2 having a volume mean diameter of 17 μm is thus obtained.

Preparation of White Particle 3

The unclassified white particles are prepared in the same manner as in the preparation of white particles 1. Then, some of the particles are sifted with a nylon sieve having a pore size of 20 μm and the other are sifted with a nylon sieve having a pore size of 26 μm to obtain particles having a desired particle diameter range. The sifted portions are combined, and the resultant particles are dried, and white particles 3 having a volume mean diameter of 23 μm is thus obtained.

Preparation of Black Particle 1

Black particles 1 are prepared in the same manner as in the preparation method of the white particles 1, except that the dispersion liquid A1 is replaced with a dispersion liquid A2 having the following composition. The volume mean diameter of the black particles 1 is 13 μm.

<Composition of Dispersion Liquid A2>
Methyl methacrylate monomer: 89 parts by mass
Diethylaminoethyl methacrylate monomer: 1 part by mass
Microris black (manufactured by Ciba Specialties Chemicals Inc.): 10 parts by mass

Example 1

First, the white particles 1 and the white particles 2 are mixed at a mass ratio of 5:1 by using a V-blender (available from Irie Shokai Company) to prepare mixed white particles A.

The mixed white particles A and the black particles 1 serving as the display particles 18 and 20 are mixed so that the blending ratio (mass ratio) of the white particles to the black particles be 6:5. Then, an image display medium and an image display device of the first embodiment which include the two kinds of the display particles thus prepared are prepared.

When a DC voltage of 100 V is applied to the transparent electrode 205, a part of the white particles 20 which have been negatively charged and adhered to the non-display substrate 16 start to move toward the display substrate 14 due to the action of an electric field. When a DC voltage of 200 V is applied, many white particles 20 move toward the display substrate 14 and an almost saturated display density is obtained (hereinafter a voltage which allows a display density to be saturated is called "driving voltage"). At this time, the black particles 18 which have been positively charged move toward the non-display substrate 16, and thereby a black and white image is displayed. Thereafter, even when the voltage applied to the transparent electrode 205 is made to be 0 V, the particles on the display substrate do not move, and the display density of the black and white image does not change.

Evaluation of Image Density at the time of Repeated Rewriting

In order to evaluate stability of image quality over time, the reflection density of an image which is obtained before repeated display described below is measured. Then, the reflection density of an image which is obtained when the repeated display under the following driving conditions A and then under the following driving conditions B has been completed is measured. Results are shown in Table 1. The reflection densities are measured and evaluated as follows.

(1) Driving Condition A

A time interval at which the polarity of a voltage applied between the display substrate 14 and the non-display substrate 16 is switched is one second.

The applied voltage is set at the driving voltage.
The polarity switching is repeated 1600 times.

(2) Driving Condition B

A time interval at which the polarity of a voltage applied between the display substrate 14 and the non-display substrate 16 is switched is 0.1 seconds.

The applied voltage is set at the driving voltage.
The polarity switching is repeated 15000 times.

Reflection Density

The reflection densities of the black portion and the white portion of each image are measured with a Macbeth densitometer (RD914) and the difference between the densities of the black portion and the white portion is obtained. Evaluation criteria are as follows. Marks A and B indicate that the images are not practically problematic.

Mark A indicates that the difference between the densities of the black portion and the white portion is 0.8 or more.

Mark B indicates that the difference between the densities of the black portion and the white portion is not less than 0.7 and less than 0.8.

Mark C indicates that the difference between the densities of the black portion and the white portion is less than 0.7.

Example 2

The white particles 1 and the white particles 2 are mixed at a mass ratio of 6:1 by using a V-blender (available from Irie Shokai Company) to prepare mixed white particles B.

The mixed white particles B and the black particles 1 serving as the display particles 18 and 20 are mixed so that the blending ratio (mass ratio) of the white particles to the black particles be 6:5. Then, an image display medium and an image display device of the first embodiment which include the two kinds of the display particles thus prepared are prepared. Subsequently, they are evaluated in the same manner as in Example 1. Results are shown in Table 1.

Example 3

The white particles 1, the white particles 2 and the white particles 3 are mixed at a mass ratio of 8:2:1 by using a V-blender (available from Irie Shokai Company) to prepare mixed white particles C.

The mixed white particles C and the black particles 1 serving as the display particles 18 and 20 are mixed so that the blending ratio (mass ratio) of the white particles to the black particles be 6:5. Then, an image display medium and an image display device of the first embodiment which include the two kinds of the display particles thus prepared are prepared. Subsequently, they are evaluated in the same manner as in Example 1. Results are shown in Table 1.

Comparative Example 1

The white particles 1 and the black particles 1 are mixed so that the blending ratio (mass ratio) of the white particles to the black particles be 6:5. Then, an image display medium and an image display device of Comparative Example 1 which are the same as the image display medium and the image display device of Example 1, except that the image display medium and the image display device include the above described mixed particles in place of the two kinds of the display particles used in Example 1. Subsequently, they are evaluated in the same manner as in Example 1. Results are shown in Table 1.

TABLE 1

| | Evaluation Results Reflection Density | |
|---|---|---|
| | Initial | After Repetition |
| Example 1 | A | B |
| Example 2 | A | A |
| Example 3 | A | A |
| Comparative Example 1 | B | C |

As is obvious from Table 1, in Comparative Example 1, the reflection density of a displayed image deteriorates over time. After display is repeated over a long period of time, a good image cannot be displayed.

Meanwhile, in Examples 1 to 3, the reflection density of a displayed image less deteriorates over time. Even after display is repeated over a long period of time, a good image can be displayed.

What is claimed is:

1. An image display medium comprising a pair of substrates disposed so as to face each other and first and second particles contained in space between the pair of substrates,
   wherein the first particles can be positively or negatively charged due to external stimulus and have one color and a particle size distribution in which at least one peak is present on a coarse side of the most frequent particle diameter of the first particles, and the second particles are not charged or can be charged due to the external stimulus to have polarity opposite to that of the first particles and have another color.

2. An image display medium according to claim 1, wherein the first particles are obtained by blending two or more kinds of particles having different particle size distributions.

3. An image display medium according to claim 1, wherein the second particles do not have a particle size distribution in which at least one peak is present on a coarse side of the most frequent particle diameter of the second particles, and the first particles have a larger specific gravity than the second particles.

4. An image display medium according to claim 2, wherein the second particles do not have a particle size distribution in which at least one peak is present on a coarse side of the most frequent particle diameter of the second particles, and the first particles have a larger specific gravity than the second particles.

5. An image display medium according to claim 1, wherein the first or second particles are white.

6. An image display medium according to claim 2, wherein the first or second particles are white.

7. An image display medium according to claim 3, wherein the first or second particles are white.

8. An image display medium according to claim 4, wherein the first or second particles are white.

9. An image display medium according to claim 5, wherein the white particles contain a colorant, and the colorant is titanium oxide.

10. An image display medium according to claim 6, wherein the white particles contain a colorant, and the colorant is titanium oxide.

11. An image display medium according to claim 7, wherein the white particles contain a colorant, and the colorant is titanium oxide.

12. An image display medium according to claim 8, wherein the white particles contain a colorant, and the colorant is titanium oxide.

13. An image formation device comprising: an image display medium that includes a pair of substrates disposed so as to face each other and first and second particles contained in space between the pair of substrates, wherein the first particles can be positively or negatively charged due to external stimulus and have one color and a particle size distribution in which at least one peak is present on a coarse side of the most frequent particle diameter of the first particles, and the second particles are not charged or can be charged due to the external stimulus to have polarity opposite to that of the first particles and have another color; and
   a generator for generating an electric field between the pair of substrates in accordance with an image to be displayed.

14. An image formation device according to claim 13, wherein the first particles are obtained by blending two or more kinds of particles having different particle size distributions.

15. An image formation device according to claim 13, wherein the second particles do not have a particle size distribution in which at least one peak is present on a coarse side of the most frequent particle diameter of the second particles, and the first particles have a larger specific gravity than the second particles.

16. An image formation device according to claim 14, wherein the second particles do not have a particle size distribution in which at least one peak is present on a coarse side of the most frequent particle diameter of the second particles, and the first particles have a larger specific gravity than the second particles.

17. An image formation device according to claim 13, wherein the first or second particles are white.

18. An image formation device according to claim 14, wherein the first or second particles are white.

19. An image formation device according to claim 15, wherein the first or second particles are white.

20. An image formation device according to claim 18, wherein the white particles contain a colorant, and the colorant is titanium oxide.

* * * * *